April 23, 1929. C. C. BOARDMAN 1,710,469
GAS FILTER
Filed Sept. 24, 1927 2 Sheets-Sheet
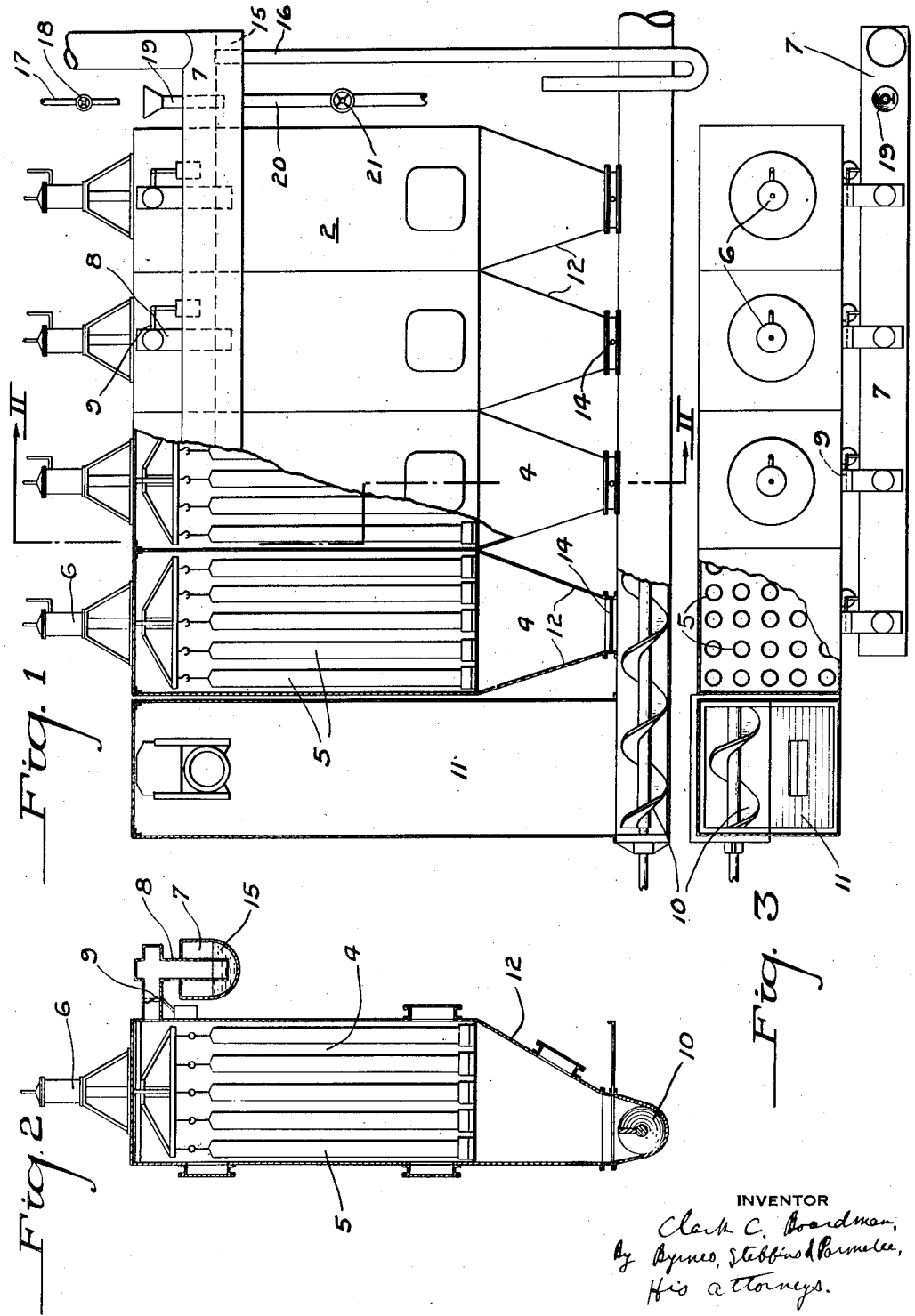

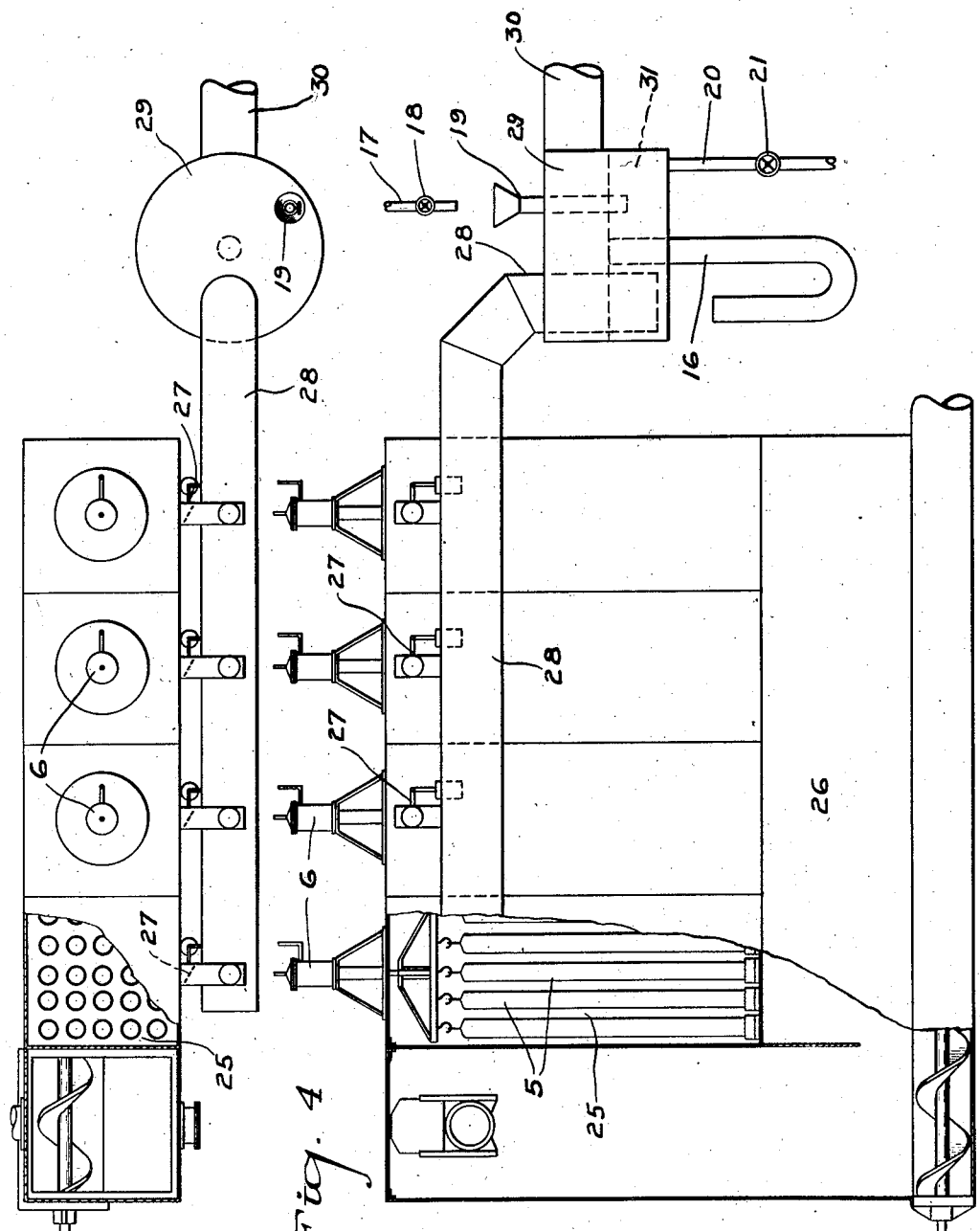

Patented Apr. 23, 1929.

1,710,469

UNITED STATES PATENT OFFICE.

CLARK C. BOARDMAN, OF STERLINGTON, LOUISIANA, ASSIGNOR TO THERMATOMIC CARBON COMPANY, OF MONROE, LOUISIANA, A CORPORATION OF DELAWARE.

GAS FILTER.

Application filed September 24, 1927. Serial No. 221,718.

My invention relates to gas filters and particularly to an automatically closed system of ducts for removing filtered gases. In the operation of gas filters, gases laden with particles of solid matter are introduced into a plurality of chambers. The gases traverse filters mounted in the filtering chambers, depositing the particles of solid matter, and escape through a system of ducts. One application of the invention is shown and described in Brownlee and Uhlinger Patent No. 1,520,115 dated Dec. 23, 1924 and Uhlinger application Serial No. 108,482 dated May 12, 1926. One form of filter is a plurality of fabric bags, one end of each of which is attached to nozzles for admitting the gases. The closed ends are attached to mechanism for imparting a vibratory or shaking movement to the fabric. Inlet and outlet valves are provided for supplying the gases to the different filtering chambers. The escaping gases have heretofore been led directly into a system of unobstructed conduits leading to a stack or other apparatus for using or treating them.

Heretofore it has been possible for gases to return from the outlet duct to the several filtering chambers if the inlet valve of any chamber should be closed and the outlet valves remain open, either by accident or by faulty operation, and the filtering chamber is opened for making repairs. In case the gases are of a combustible nature, it is very important that provision be made for preventing the escape of the gases from the duct.

I provide a liquid seal for preventing the return of the filtered gases to any of the filtering chambers in the event that the outlet valve or damper should be left open.

The liquid seal may be designed to close off communication between each of a group of filtering chambers and the duct or it may be designed to seal the duct from other apparatus. In either form of the invention the gases are led into the liquid seal at a point below its level. The horizontal cross sectional area of the dip pipe, in the seal chamber, is very much less than the horizontal cross sectional area of the seal chamber, therefore gas pressure from the collecting chamber depresses the liquid level in the dip pipe with little appreciable rise of the level in the seal chamber and the gases bubble under the edge of the pipe during operation with small loss of pressure head. In the event that the inlet valve on one chamber is closed, or that one battery of chambers, with a common seal, is shut off, back pressure from the discharge line raises the level in the dip pipe to a much greater extent than the level in the chamber can be lowered.

The difference in liquid levels would balance the back pressure without permitting gases to bubble in a reverse direction. The relative areas of the dip pipe and the seal chamber and the vertical length of dip pipe will depend on the back pressures to be expected. The level of the liquid in the seal is controlled by an overflow device. A liquid seal is particularly useful where the gases are inflammable and might became ignited if permitted to re-enter the chambers when opened for repairs.

The escaping gases from filters heretofore employed have always contained a small percentage of particles of solid matter that have not been removed by the filters. By passing the escaping gas through a liquid seal, the gas is washed. If the particles of matter accumulated in the seal are lighter than the liquid, they float on the surface thereof and may be washed out through the overflow device. If the particles are heavier than the liquid, they settle to the bottom of the seal and may be periodically removed by the manipulation of a clean-out valve.

The accompanying drawings illustrate the present preferred embodiment of the invention in which,—

Figure 1 is a view, partially in elevation and partially in section, of a gas filter embodying my invention;

Figure 2 is an end view, partially in elevation and partially in section, of a portion of the filter taken along the section line II—II of Figure 1;

Figure 3 is a broken plan view of the filter;

Figure 4 is a view, partially in elevation and partially in section, of a modified form of the invention; and Figure 5 is a broken plan view of the modification shown in Figure 4.

Referring to Figures 1 to 3, inclusive, a fluid filter 2 comprising a plurality of filtering chambers 4 having a plurality of filters 5 mounted therein and energized by a vibrating or shaking device 6 is provided with a duct 7 connected to the several chambers 4 by pipes 8 and dampers or valves 9. A conveyor 10 is provided for receiving accumulations of solid matter from the chambers 4 and for admitting gases thereto from a gas chamber 11. Each filtering chamber 4 is provided with a tapering hopper 12 for conducting gases thereto and for delivering the filtered material to the conveyor 10. The hoppers 12 are provided with inlet valves or dampers 14.

The pipes 8 extending from the outlet valves or dampers 9 are directed downwardly into the duct 7 which is preferably of D-shape and terminate considerably below the level of the liquid 15 contained therein. A common liquid for use in the duct 7 is water, although other chemicals may be substituted therefor in accordance with the nature of the gases passing therethrough. The projection of the pipes 8 below the surface of the liquid 15 prevents the backward movement of gas from the ducts 7 into the several chambers 4. A material advantage of this construction is that backward flow of gases is automatically prevented, whereas if the valves 9 are relied upon, the operator may neglect or be unable to reach it or them in time to prevent the backward movement of an appreciable quantity of the gases.

The gases upon bubbling through the liquid 15 are washed and particles of matter that are lighter than liquid gather upon the surface thereof and heavier particles are deposited in the bottom of the duct 7. This feature is particularly advantageous in the event that one or more of the filters becomes defective, and permits the escape of unfiltered gases. The clogging up of the duct 7 by accumulations of solid matter is prevented since the duct may be washed out from time to time when desired.

The heights of the pipes 8 are so proportioned relative to the liquid level in the duct 7, that back pressures on the duct will raise the liquid level in the pipes 8 for a distance but other relief is given to the duct before the liquid can be blown back into the chambers 4. The relief mechanism may be in the form of a valve or the height of an overflow or supply pipe may be proportioned to permit the excess pressure to be dissipated therethrough rather than through the pipes 8. The level of the liquid 15 is determined by the height of an overflow pipe 16, preferably of U-shape to constitute a liquid seal.

Liquid is supplied to the duct 7 from a pipe line 17 controlled by a valve 18 through a stand pipe 19. Pipe 19 projects beneath the surface of the liquid a distance less than the projection of the pipes 8 for reasons heretofore stated in connection with the relief of back pressures in the duct 7. For withdrawing accumulations of solid matter in the duct 7 a drain pipe 20 and valve 21 are provided.

Referring to Figures 4 and 5, there is illustrated a modification of the invention in which the liquid seal is applied to the structure shown and described in the application of Joseph A. Miller, Serial No. 221,228 filed Sept. 22, 1927. (Case No. 27,656.) In this form of the invention the filtering chambers 25 are connected directly to a common hopper 26. The inlet valves 14 shown in the other form of the invention, are eliminated. Outlet valves 27, here illustrated as dampers, are connected to a common duct 28. The duct 28 extends downwardly into a liquid seal 29. A take-off pipe 30 is provided for the seal 29. The duct extends below the level of liquid 31 in the liquid seal 29 in the same manner that the pipes 8 extend below the level of the liquid in the other form of the invention. The liquid seal is provided with an overflow device 16, of U-shape, a drain pipe 20, valve 21, a supply pipe 17, a valve 18 and stand pipe 19, as in the other form of the invention.

In this form of the invention the several chambers 25 are arranged in groups and each group is controlled by a liquid seal placed in the discharge duct. The liquid seal 29 prevents the reverse movement of gases to the chambers 25 constituting each group.

It is to be understood that various changes may be made in the invention without departing from the scope of the appended claims.

I claim:

1. A filtering device for separating particles of solid matter from a gas, comprising a plurality of vertically disposed groups of filters, a common discharge duct extending in a substantially horizontal direction, means for connecting the several groups of filters to the duct, means for maintaining a liquid level in at least a portion of the duct for constituting a liquid seal, a duct for disposing of gas after traversing the liquid seal, and a pipe associated with the liquid seal for controlling the accumulation of back pressure in the first-named duct.

2. A filtering device for separating particles of solid matter from gas, comprising a plurality of vertically disposed groups of filters, a common discharge duct extending in a substantially horizontal direction, means for connecting the several groups of filters to the duct, means for maintaining a liquid level in at least a portion of the duct for constituting a liquid seal, a duct for disposing of gas after traversing the liquid seal, and a vertically extending pipe associated with the liquid seal for controlling the accumulation of back pressure in the first-named duct.

3. A filtering device for separating particles of solid matter from a gas, comprising a vertically extending filter, a discharge duct extending in a substantially horizontal direction, means for connecting the filter to the duct, means for maintaining a liquid level in at least a portion of the duct for constituting a liquid seal, a duct for disposing of gas after transversing the liquid seal, and a pipe associated with the liquid seal for controlling the accumulation of back pressure in the first-named duct.

4. A filtering device for separating particles of solid matter from a gas, comprising a vertically extending filter, a discharge duct extending in a substantially horizontal direction, means for connecting the filter to the duct, means for maintaining a liquid level in at least a portion of the duct for constituting a liquid seal, a duct for disposing of gas after traversing the liquid seal, and a vertically extending pipe associated with the liquid seal for contributing the accumulation of back pressure in the first-named duct.

In testimony whereof I have hereunto set my hand.

CLARK C. BOARDMAN.